US008570374B2

(12) United States Patent
Betham et al.

(10) Patent No.: US 8,570,374 B2
(45) Date of Patent: Oct. 29, 2013

(54) CAMERA FOR VEHICLE

(75) Inventors: Laura Betham, Livonia, MI (US); Matthew C. Sesti, Williamston, MI (US); Neal Jonathan Todd, Chesterfield, MI (US); Brian Dean Brasier, Howell, MI (US); Axel Nix, Birmingham, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 992 days.

(21) Appl. No.: 12/618,153

(22) Filed: Nov. 13, 2009

(65) Prior Publication Data

US 2010/0118145 A1 May 13, 2010

Related U.S. Application Data

(60) Provisional application No. 61/114,111, filed on Nov. 13, 2008, provisional application No. 61/158,805, filed on Mar. 10, 2009.

(51) Int. Cl.
*H04N 7/18* (2006.01)

(52) U.S. Cl.
USPC ............... 348/148; 348/211.4; 348/211.8

(58) Field of Classification Search
USPC .................. 348/148, 211.4, 211.8
See application file for complete search history.

(56) References Cited

U.S. PATENT DOCUMENTS

| | | | |
|---|---|---|---|
| 2,414,223 A | 1/1947 | De Virgilis | |
| 3,870,404 A | 3/1975 | Wilson et al. | |
| 4,065,750 A | 12/1977 | Duncan et al. | |
| 4,274,078 A | 6/1981 | Isobe et al. | |
| 4,286,305 A | 8/1981 | Pilat et al. | |
| 4,443,057 A | 4/1984 | Bauer et al. | |
| 4,646,210 A | 2/1987 | Skogler et al. | |
| 4,646,673 A | 3/1987 | Fordyce | |

(Continued)

FOREIGN PATENT DOCUMENTS

| | | |
|---|---|---|
| DE | 3525672 | 1/1987 |
| DE | 3605704 | 8/1987 |

(Continued)

OTHER PUBLICATIONS

"Combination of rain sensing, autolamps and telephone antenna in one module," Research Disclosure, Kenneth Mason Publications, Hampshire, GB No. 412, Aug. 1998, p. 1045XP-000824825.

(Continued)

*Primary Examiner* — Ramy M Osman
(74) *Attorney, Agent, or Firm* — Gardner, Linn, Burkhart & Flory, LLP

(57) ABSTRACT

In a first embodiment, the invention is directed to a camera for mounting on a vehicle, including a lens member, an imaging element and an image processing board. The image processing board is separated sufficiently from the imaging element so as to impart relatively little heat generated during operation to the imaging element. The imaging element is positioned to receive video input from the lens member. The image processing board is configured to generate image processing board output data that relates to the video input received by the imaging element. The image processing board is positioned in a selected position to release heat along a heat path that is spaced from the imaging element. The camera may further include a vehicle interface board configured to communicate signals relating to the image processing board output data to a vehicle component.

9 Claims, 2 Drawing Sheets

(56) References Cited

U.S. PATENT DOCUMENTS

| | | |
|---|---|---|
| 4,733,336 A | 3/1988 | Skogler et al. |
| 4,760,497 A | 7/1988 | Roston |
| 4,768,135 A | 8/1988 | Kretschmer et al. |
| 4,781,436 A | 11/1988 | Armbruster |
| 4,793,690 A | 12/1988 | Gahan et al. |
| 4,807,096 A | 2/1989 | Skogler et al. |
| 4,859,867 A | 8/1989 | Larson et al. |
| 4,863,130 A | 9/1989 | Marks, Jr. |
| 4,871,917 A | 10/1989 | O'Farrell et al. |
| 4,886,960 A | 12/1989 | Molyneux et al. |
| 4,891,559 A | 1/1990 | Matsumoto et al. |
| 4,895,097 A | 1/1990 | Lechnir |
| 4,916,374 A | 4/1990 | Schierbeek et al. |
| 4,930,742 A | 6/1990 | Schofield et al. |
| 4,936,533 A | 6/1990 | Adams et al. |
| 4,956,591 A | 9/1990 | Schierbeek et al. |
| 4,967,319 A | 10/1990 | Seko |
| 4,973,844 A | 11/1990 | O'Farrell et al. |
| 5,058,851 A | 10/1991 | Lawlor et al. |
| 5,100,095 A | 3/1992 | Haan et al. |
| 5,140,455 A | 8/1992 | Varaprasad et al. |
| 5,151,816 A | 9/1992 | Varaprasad et al. |
| 5,178,448 A | 1/1993 | Adams et al. |
| 5,193,029 A | 3/1993 | Schofield et al. |
| 5,255,442 A | 10/1993 | Schierbeek et al. |
| 5,264,997 A | 11/1993 | Hutchisson et al. |
| 5,266,873 A | 11/1993 | Arditi et al. |
| 5,327,288 A | 7/1994 | Wellington et al. |
| 5,330,149 A | 7/1994 | Haan et al. |
| D351,370 S | 10/1994 | Lawlor et al. |
| 5,361,190 A | 11/1994 | Roberts |
| 5,371,659 A | 12/1994 | Pastrick et al. |
| 5,377,949 A | 1/1995 | Haan et al. |
| 5,426,294 A | 6/1995 | Kobayashi et al. |
| 5,439,305 A | 8/1995 | Santo |
| 5,455,716 A | 10/1995 | Suman et al. |
| 5,469,298 A | 11/1995 | Suman et al. |
| 5,475,366 A | 12/1995 | Van Lente et al. |
| 5,487,522 A | 1/1996 | Hook |
| 5,488,352 A | 1/1996 | Jasper |
| 5,497,306 A | 3/1996 | Pastrick |
| 5,521,760 A | 5/1996 | De Young et al. |
| 5,530,240 A | 6/1996 | Larson et al. |
| 5,537,003 A | 7/1996 | Bechtel et al. |
| 5,550,677 A | 8/1996 | Schofield et al. |
| 5,566,224 A | 10/1996 | ul Azam et al. |
| 5,570,127 A | 10/1996 | Schmidt |
| 5,572,354 A | 11/1996 | Desmond et al. |
| 5,576,687 A | 11/1996 | Blank et al. |
| 5,582,383 A | 12/1996 | Mertens et al. |
| 5,587,236 A | 12/1996 | Agrawal et al. |
| 5,609,652 A | 3/1997 | Yamada et al. |
| 5,615,857 A | 4/1997 | Hook |
| 5,631,638 A | 5/1997 | Kaspar et al. |
| 5,632,551 A | 5/1997 | Roney et al. |
| 5,649,756 A | 7/1997 | Adams et al. |
| 5,654,686 A | 8/1997 | Geschke et al. |
| 5,659,423 A | 8/1997 | Schierbeek et al. |
| 5,660,454 A | 8/1997 | Mori et al. |
| 5,661,455 A | 8/1997 | Van Lente et al. |
| 5,666,157 A | 9/1997 | Aviv |
| 5,669,698 A | 9/1997 | Veldman et al. |
| 5,669,705 A | 9/1997 | Pastrick et al. |
| 5,671,996 A | 9/1997 | Bos et al. |
| 5,689,241 A | 11/1997 | Clarke, Sr. et al. |
| 5,691,848 A | 11/1997 | Van Lente et al. |
| 5,703,568 A | 12/1997 | Hegyi |
| 5,708,410 A | 1/1998 | Blank et al. |
| 5,708,743 A | 1/1998 | DeAndrea et al. |
| 5,774,283 A | 6/1998 | Nagel et al. |
| 5,786,772 A | 7/1998 | Schofield et al. |
| 5,796,094 A | 8/1998 | Schofield et al. |
| 5,796,176 A | 8/1998 | Kramer et al. |
| 5,798,575 A | 8/1998 | O'Farrell et al. |
| 5,820,097 A | 10/1998 | Spooner |
| 5,820,245 A | 10/1998 | Desmond et al. |
| 5,825,283 A | 10/1998 | Camhi |
| 5,837,891 A | 11/1998 | Bridge |
| 5,845,000 A | 12/1998 | Breed et al. |
| 5,863,116 A | 1/1999 | Pastrick et al. |
| 5,878,353 A | 3/1999 | ul Azam et al. |
| 5,910,854 A | 6/1999 | Varaprasad et al. |
| 5,923,027 A | 7/1999 | Stam et al. |
| 5,926,087 A | 7/1999 | Busch et al. |
| 5,940,503 A | 8/1999 | Palett et al. |
| 5,947,586 A | 9/1999 | Weber |
| 5,971,552 A | 10/1999 | O'Farrell et al. |
| 6,000,823 A | 12/1999 | Desmond et al. |
| 6,006,159 A | 12/1999 | Schmier et al. |
| 6,020,704 A | 2/2000 | Buschur |
| 6,028,537 A | 2/2000 | Suman et al. |
| 6,056,410 A | 5/2000 | Hoekstra et al. |
| 6,087,942 A | 7/2000 | Sleichter, III et al. |
| 6,087,953 A | 7/2000 | DeLine et al. |
| 6,089,721 A | 7/2000 | Schierbeek |
| 6,097,023 A | 8/2000 | Schofield |
| 6,097,024 A | 8/2000 | Stam et al. |
| 6,100,798 A | 8/2000 | Liang |
| 6,108,084 A | 8/2000 | Winner |
| 6,124,647 A | 9/2000 | Marcus et al. |
| 6,124,886 A | 9/2000 | DeLine et al. |
| 6,151,065 A * | 11/2000 | Steed et al. .................. 348/148 |
| 6,158,655 A | 12/2000 | DeVries, Jr. et al. |
| 6,166,625 A | 12/2000 | Teowee et al. |
| 6,166,698 A | 12/2000 | Turnbull et al. |
| 6,170,955 B1 | 1/2001 | Campbell et al. |
| 6,172,613 B1 | 1/2001 | DeLine et al. |
| 6,176,602 B1 | 1/2001 | Pastrick et al. |
| 6,198,087 B1 | 3/2001 | Boon |
| 6,198,409 B1 | 3/2001 | Schofield et al. |
| 6,207,967 B1 | 3/2001 | Hochstein |
| 6,210,008 B1 | 4/2001 | Hoekstra et al. |
| 6,222,460 B1 | 4/2001 | DeLine et al. |
| 6,229,226 B1 | 5/2001 | Kramer et al. |
| 6,229,434 B1 | 5/2001 | Knapp et al. |
| 6,243,003 B1 | 6/2001 | DeLine et al. |
| 6,250,148 B1 | 6/2001 | Lynam |
| 6,259,359 B1 | 7/2001 | Fujinami et al. |
| 6,276,821 B1 | 8/2001 | Pastrick et al. |
| 6,278,377 B1 | 8/2001 | DeLine et al. |
| 6,291,905 B1 | 9/2001 | Drummond et al. |
| 6,294,989 B1 | 9/2001 | Schofield et al. |
| 6,296,379 B1 | 10/2001 | Pastrick |
| 6,299,316 B1 | 10/2001 | Fletcher et al. |
| 6,299,319 B1 | 10/2001 | Mertens et al. |
| 6,305,807 B1 | 10/2001 | Schierbeek |
| 6,313,454 B1 | 11/2001 | Bos et al. |
| 6,318,697 B1 | 11/2001 | Corrado et al. |
| 6,320,176 B1 | 11/2001 | Schofield et al. |
| 6,323,477 B1 | 11/2001 | Blasing et al. |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,013 B1 | 1/2002 | Battiti et al. |
| 6,341,523 B2 | 1/2002 | Lynam |
| 6,353,392 B1 | 3/2002 | Schofield et al. |
| 6,366,213 B2 | 4/2002 | DeLine et al. |
| 6,386,742 B1 | 5/2002 | DeLine et al. |
| 6,392,218 B1 | 5/2002 | Kuehnle |
| 6,406,152 B1 | 6/2002 | Hoekstra et al. |
| 6,412,973 B1 | 7/2002 | Bos et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,452,148 B1 | 9/2002 | Bendicks et al. |
| 6,466,136 B2 | 10/2002 | DeLine et al. |
| 6,477,464 B2 | 11/2002 | McCarthy et al. |
| 6,496,117 B2 | 12/2002 | Gutta et al. |
| 6,498,967 B1 | 12/2002 | Hopkins et al. |
| 6,501,387 B2 | 12/2002 | Skiver et al. |
| 6,513,252 B1 | 2/2003 | Schierbeek et al. |
| 6,516,664 B2 | 2/2003 | Lynam |
| 6,545,598 B1 | 4/2003 | De Villeroche |

(56) References Cited

U.S. PATENT DOCUMENTS

| | | |
|---|---|---|
| 6,555,804 B1 | 4/2003 | Blasing |
| 6,564,122 B1 | 5/2003 | Huertgen et al. |
| 6,587,573 B1 | 7/2003 | Stam et al. |
| 6,593,565 B2 | 7/2003 | Heslin et al. |
| 6,596,978 B2 | 7/2003 | Hochstein |
| 6,603,137 B2 | 8/2003 | Hochstein |
| 6,614,043 B2 | 9/2003 | Hochstein |
| 6,615,650 B2 | 9/2003 | Mahner et al. |
| 6,617,564 B2 | 9/2003 | Ockerse et al. |
| 6,646,359 B2 | 11/2003 | Schaefer et al. |
| 6,648,477 B2 | 11/2003 | Hutzel et al. |
| 6,653,615 B2 | 11/2003 | Bechtel et al. |
| 6,660,360 B2 | 12/2003 | Mertzel et al. |
| 6,672,744 B2 | 1/2004 | DeLine et al. |
| 6,672,745 B1 | 1/2004 | Bauer et al. |
| 6,690,268 B2 | 2/2004 | Schofield et al. |
| 6,731,071 B2 | 5/2004 | Baarman |
| 6,734,904 B1 | 5/2004 | Boon et al. |
| 6,737,963 B2 | 5/2004 | Gutta et al. |
| 6,738,088 B1 | 5/2004 | Uskolovsky et al. |
| 6,742,904 B2 | 6/2004 | Bechtel et al. |
| 6,742,905 B2 | 6/2004 | Suyama et al. |
| 6,765,480 B2 | 7/2004 | Tseng |
| 6,768,092 B2 | 7/2004 | Sakata |
| 6,774,356 B2 | 8/2004 | Heslin et al. |
| 6,774,810 B2 | 8/2004 | DeLine et al. |
| 6,784,129 B2 | 8/2004 | Seto et al. |
| 6,799,904 B2 | 10/2004 | Schaefer et al. |
| 6,803,574 B2 | 10/2004 | Abel et al. |
| 6,806,485 B2 | 10/2004 | Jackson, Jr. |
| 6,812,645 B2 | 11/2004 | Baarman |
| 6,824,281 B2 | 11/2004 | Schofield et al. |
| 6,825,620 B2 | 11/2004 | Kuennen et al. |
| 6,831,268 B2 | 12/2004 | Bechtel et al. |
| 6,831,288 B1 | 12/2004 | Schmitt et al. |
| 6,832,719 B2 | 12/2004 | DeVries, Jr. et al. |
| 6,841,767 B2 | 1/2005 | Mindl et al. |
| 6,867,510 B2 | 3/2005 | Kramer et al. |
| 6,877,870 B2 | 4/2005 | Krug |
| 6,877,888 B2 | 4/2005 | DeLine et al. |
| 6,889,064 B2 | 5/2005 | Baratono et al. |
| 6,894,619 B1 | 5/2005 | Schmitt et al. |
| 6,917,163 B2 | 7/2005 | Baarman |
| 6,924,470 B2 | 8/2005 | Bechtel et al. |
| 6,930,593 B2 | 8/2005 | Crawshaw |
| 6,968,736 B2 | 11/2005 | Lynam |
| 6,975,215 B2 | 12/2005 | Schofield et al. |
| 6,975,390 B2 | 12/2005 | Mindl et al. |
| 6,980,092 B2 | 12/2005 | Turnbull et al. |
| 6,995,354 B2 | 2/2006 | Hagan et al. |
| 7,004,593 B2 | 2/2006 | Weller et al. |
| 7,041,965 B2 | 5/2006 | Heslin et al. |
| 7,053,761 B2 | 5/2006 | Schofield et al. |
| 7,075,511 B1 | 7/2006 | Mousseau et al. |
| 7,108,409 B2 | 9/2006 | DeLine et al. |
| 7,111,996 B2 | 9/2006 | Seger et al. |
| 7,188,963 B2 | 3/2007 | Schofield et al. |
| 7,195,381 B2 | 3/2007 | Lynam et al. |
| 7,199,767 B2 | 4/2007 | Spero |
| 7,205,524 B2 | 4/2007 | Drummond et al. |
| 7,242,320 B2 | 7/2007 | Lawlor et al. |
| 7,249,860 B2 | 7/2007 | Kulas et al. |
| 7,255,451 B2 | 8/2007 | McCabe et al. |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,289,037 B2 | 10/2007 | Uken et al. |
| 7,297,932 B2 | 11/2007 | Georgiadis et al. |
| 7,304,680 B2 | 12/2007 | Köhler et al. |
| 7,311,428 B2 | 12/2007 | DeLine et al. |
| 7,322,755 B2 | 1/2008 | Neumann et al. |
| 7,370,983 B2 | 5/2008 | DeWind et al. |
| 7,420,159 B2 | 9/2008 | Heslin et al. |
| 7,438,774 B2 | 10/2008 | Kurfiss et al. |
| 7,446,427 B2 | 11/2008 | Parker et al. |
| 7,460,007 B2 | 12/2008 | Schofield et al. |
| 7,463,281 B2* | 12/2008 | Luskin et al. ............ 348/148 |
| 7,467,883 B2 | 12/2008 | DeLine et al. |
| 7,480,149 B2 | 1/2009 | DeWard et al. |
| 7,490,944 B2 | 2/2009 | Blank et al. |
| 7,497,632 B2 | 3/2009 | Kajino et al. |
| 7,538,316 B2 | 5/2009 | Heslin et al. |
| 7,570,793 B2 | 8/2009 | Lages et al. |
| 7,609,961 B2 | 10/2009 | Park |
| 7,646,889 B2 | 1/2010 | Tsukamoto |
| 7,651,228 B2 | 1/2010 | Skiver et al. |
| 7,657,052 B2 | 2/2010 | Larson et al. |
| 7,658,521 B2 | 2/2010 | DeLine et al. |
| 7,697,028 B1 | 4/2010 | Johnson |
| 7,719,408 B2 | 5/2010 | DeWard et al. |
| 7,728,721 B2 | 6/2010 | Schofield et al. |
| 7,755,668 B1* | 7/2010 | Johnston et al. ......... 348/211.4 |
| 7,780,137 B2 | 8/2010 | Hansel et al. |
| 7,780,454 B2 | 8/2010 | Baranski |
| 7,811,011 B2 | 10/2010 | Blaesing et al. |
| 7,817,205 B2 | 10/2010 | Schulte et al. |
| 7,837,173 B2 | 11/2010 | Zinzer et al. |
| 7,855,353 B2 | 12/2010 | Blaesing et al. |
| 7,855,755 B2 | 12/2010 | Weller et al. |
| 7,860,275 B2 | 12/2010 | Leleve et al. |
| 7,864,981 B2 | 1/2011 | Leleve et al. |
| 7,888,629 B2 | 2/2011 | Heslin et al. |
| 7,889,086 B2 | 2/2011 | Schafer et al. |
| 7,911,356 B2 | 3/2011 | Wohlfahrt et al. |
| 7,914,188 B2 | 3/2011 | DeLine et al. |
| 7,916,009 B2 | 3/2011 | Schofield et al. |
| 7,940,305 B2 | 5/2011 | Adameck |
| 7,965,336 B2 | 6/2011 | Bingle et al. |
| 7,994,471 B2 | 8/2011 | Heslin et al. |
| 8,051,707 B2 | 11/2011 | Roehr et al. |
| 8,094,002 B2 | 1/2012 | Schofield et al. |
| 8,134,117 B2 | 3/2012 | Heslin et al. |
| 8,179,437 B2 | 5/2012 | Schofield et al. |
| 8,192,095 B2 | 6/2012 | Kortan et al. |
| 8,256,821 B2 | 9/2012 | Lawlor et al. |
| 8,288,711 B2 | 10/2012 | Heslin et al. |
| 8,309,907 B2 | 11/2012 | Heslin et al. |
| 8,325,028 B2 | 12/2012 | Schofield et al. |
| 8,339,453 B2 | 12/2012 | Blake, III et al. |
| 2002/0075387 A1 | 6/2002 | Janssen |
| 2002/0126457 A1 | 9/2002 | Kameyama |
| 2003/0081128 A1* | 5/2003 | Kirmuss ............ 348/207.99 |
| 2004/0200948 A1 | 10/2004 | Bos et al. |
| 2005/0237385 A1 | 10/2005 | Kosaka et al. |
| 2006/0050018 A1 | 3/2006 | Hutzel et al. |
| 2006/0061008 A1 | 3/2006 | Karner et al. |
| 2007/0132610 A1 | 6/2007 | Guernalec et al. |
| 2007/0235638 A1 | 10/2007 | Backes et al. |
| 2008/0092673 A1 | 4/2008 | Hansel et al. |
| 2008/0225538 A1* | 9/2008 | Lynam et al. ............ 362/494 |
| 2010/0208077 A1 | 8/2010 | DeWard et al. |
| 2011/0155874 A1 | 6/2011 | Roehr et al. |
| 2012/0224065 A1 | 9/2012 | Schofield et al. |
| 2012/0310519 A1 | 12/2012 | Lawlor et al. |

FOREIGN PATENT DOCUMENTS

| | | |
|---|---|---|
| DE | 9306989.8 | 7/1993 |
| DE | 4214223 | 11/1993 |
| DE | 4329983 | 3/1995 |
| DE | 29513369 | 12/1995 |
| DE | 19647200 | 1/1998 |
| DE | 29805142 | 6/1998 |
| DE | 19755008 | 7/1999 |
| DE | 10132982 | 1/2003 |
| DE | 10211444 | 10/2003 |
| DE | 10237554 | 3/2004 |
| DE | 10237607 | 3/2004 |
| DE | 10342837 | 4/2005 |
| DE | 102005002686 | 8/2006 |
| DE | 102005015973 | 10/2006 |
| DE | 102006039065 | 3/2007 |
| EP | 0461424 | 12/1991 |
| EP | 0667254 | 8/1995 |

(56) References Cited

FOREIGN PATENT DOCUMENTS

| | | |
|---|---|---|
| EP | 0928723 | 7/1999 |
| EP | 0969275 | 1/2000 |
| EP | 1376051 | 1/2004 |
| EP | 1389565 | 2/2004 |
| GB | 2210835 | 6/1989 |
| GB | 2316379 | 2/1998 |
| JP | 59029539 | 2/1984 |
| JP | 62043543 | 2/1987 |
| JP | 11131880 | 5/1999 |
| JP | 11254925 | 9/1999 |
| WO | WO9814974 | 4/1998 |
| WO | WO9914088 | 3/1999 |
| WO | WO9923828 | 5/1999 |

OTHER PUBLICATIONS

N.R. Lynam, "Electrochromic Automotive Day/Night Minor," *SAE Technical Paper Series*, 870636 (1987).

N.R. Lynam, "Smart Windows for Automobiles," *SAE Technical Paper Series*, 900419 (1990).

N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

* cited by examiner

CAMERA FOR VEHICLE

This application claims the benefits of U.S. Provisional applications 61/114,111, filed November 13, 2008 and U.S. Provisional Application No. 61/158,805, filed Mar. 10, 2009.

FIELD OF THE INVENTION

The present invention relates to a camera for use in vehicles, and more particularly to a forward-facing, windshield-mounted camera for use in vehicles.

BACKGROUND OF THE INVENTION

Forward-facing cameras are used in vehicles for several purposes. Such cameras may be used for lane-departure sensing, oncoming vehicle headlight detection, accident avoidance and/or other purposes. Some cameras are mounted on the interior surface of the windshield at a suitable location so as not to unduly obstruct the driver's view. Such cameras may be installed in sedans, SUVs, trucks, cross-overs, sports coupes, and other types of vehicle. Such a range of vehicles encompasses a relatively large range of rake angles for the windshield. As a result, a manufacturer typically carries several different configurations of camera housing to accommodate the different windshield rake angles associated with each different type of vehicle or each different vehicle model on which such cameras are mounted. As a result, the cost associated with such cameras may be relatively high. Additionally, as a result of the position of the camera (ie. against the windshield), the camera is preferably configured to reduce its impact on the driver's view, while being suitably configured to handle heat buildup that can take place therein during use. Heat can cause the imaging element in the camera to lose the ability to detect contrast.

It would be advantageous to provide a camera that addresses one or more of these considerations.

SUMMARY OF THE INVENTION

In a first aspect, the invention is directed to a camera for mounting on a vehicle, including a lens member, an imaging element and an image processing board. The image processing board may comprise a digital signal processor (DSP), an application-specific integrated circuit (ASIC), a microcontroller and other elements, which can generate heat during use. The image processing board is separated sufficiently from the imaging element so as to impart relatively little heat generated during operation to the imaging element.

In a particular embodiment of the first aspect, the imaging element is positioned to receive video input from the lens member. The image processing board is configured to generate image processing board output data that relates to the video input received by the imaging element. The camera may further include a vehicle interface board configured to communicate signals relating to the image processing board output data to a vehicle component. The image processing board is positioned in a selected position to release heat along a heat path that is spaced from the imaging element.

In a second aspect, the invention is directed to a camera for mounting on a mounting surface (eg. a vehicle windshield) on a vehicle including a lens member, an imaging element, a vehicle interface board and a housing. The housing is configured so that at least a portion of the housing can be used for a range of angles of mounting surface (eg. windshield rake angles) thereby reducing the manufacturing costs to adapt the camera to different mounting surface angles (eg. windshield rake angles) associated with different vehicle models.

In a particular embodiment of the second aspect, the imaging element is positioned to receive video input from the lens member. The vehicle interface board is configured to communicate signals relating to the video input to a vehicle component. The housing including a front housing member, an upper housing member and a lower housing member. The front housing member holds the lens member and is hingeably connected to the upper housing member.

In a third aspect, the invention is directed to a camera for mounting on a camera for mounting on a vehicle windshield, wherein the camera is configured so as to not unduly obscure the driver's view out through the windshield.

In a particular embodiment of the third aspect, the camera includes a housing, a lens member, an imaging element, an image processing board and a vehicle interface board. The housing has an upper housing wall and is mountable to the vehicle windshield such that the upper housing wall is generally parallel to the vehicle windshield. The imaging element is positioned to receive video input from the lens member. The image processing board is configured to generate image processing board output data that relates to the video input received by the imaging element. The vehicle interface board is configured to communicate signals relating to the image processing board output data to a vehicle component. The housing is configured to be at a selected angle relative to the lens member. The image processing board and the vehicle interface board are positioned behind the imaging element and are generally parallel to the housing.

BRIEF DESCRIPTION OF THE DRAWINGS

The present invention will now be described by way of example only with reference to the attached drawings, in which.

DETAILED DESCRIPTION OF THE INVENTION

Figure 1:
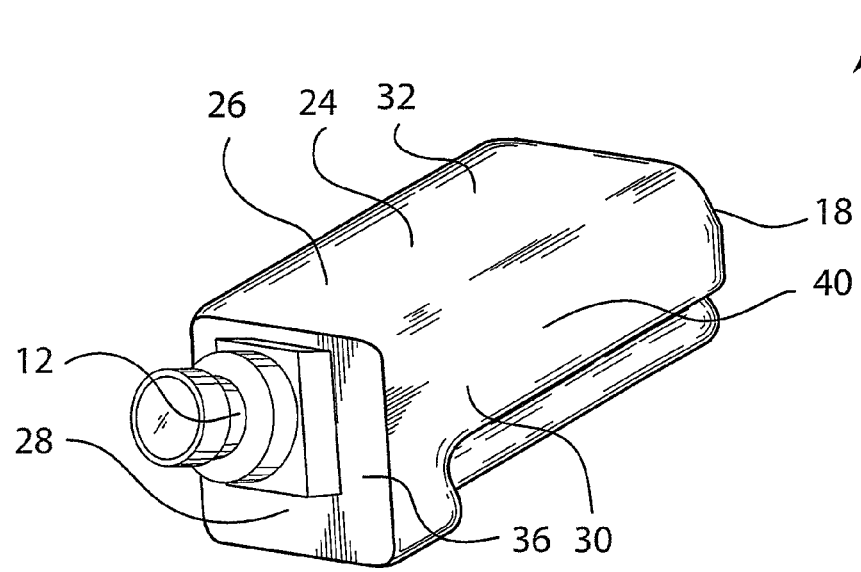
FIG. 1 is a perspective view of a camera in accordance with an embodiment of the present invention.
Figure 2:
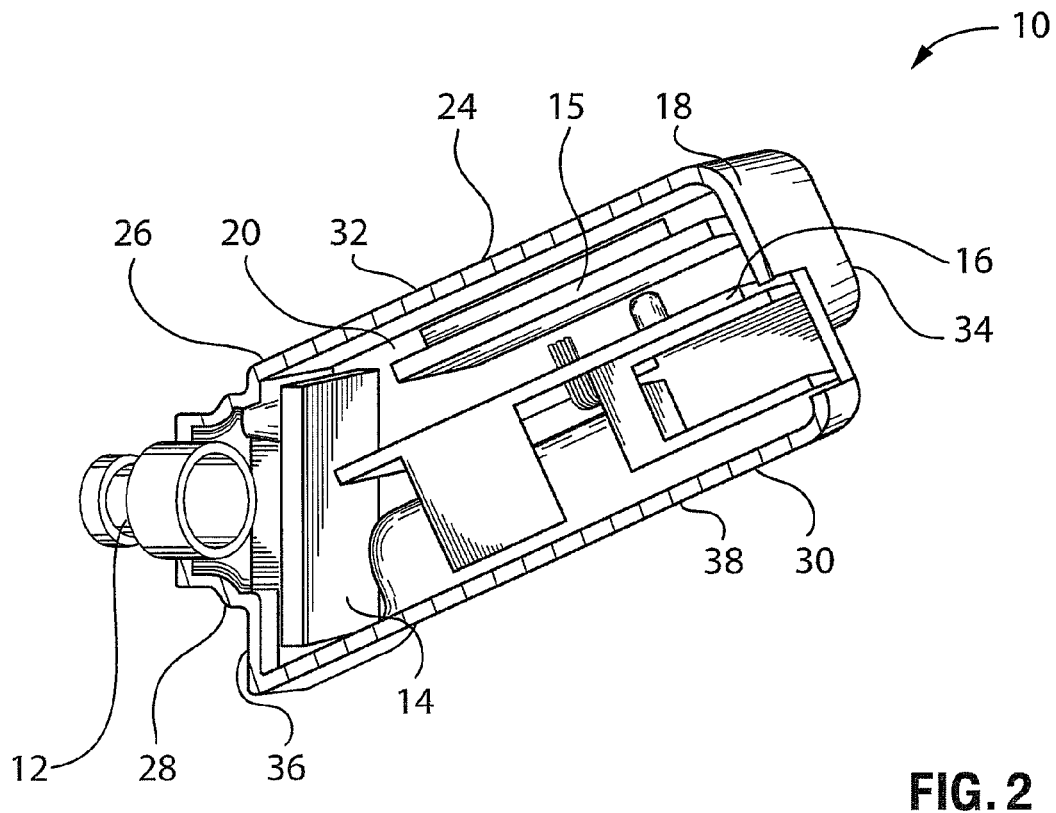
FIG. 2 is a sectional perspective view of the camera shown in FIG. 1.

Reference is made to FIG. 1, which shows a camera 10 for use in a vehicle, and in particular for use as a forward view camera in a vehicle. Referring to FIG. 2, the camera 10 includes a lens member 12, an imaging element 14, an image processing board 15, a vehicle interface board 16 and a housing 18. The camera 10 is configured to protect the imaging element 14 from heat buildup, as the performance of the imaging element 14 may be impacted by exposure of the imaging element 14 to heat.

The lens member 12 may be any suitable lens member known in the art, and is mounted to the front housing member 16. The camera 10 may be configured so that the lens member 12 extends generally horizontally. The imaging element 14 is positioned in a selected position to receive images through the lens member 12. For example, the imaging element 14 may be oriented generally vertically a selected distance behind the lens member 12. The imaging element 14 may be, for example, a circuit board with an image sensor thereon. The image sensor may be any suitable type of sensor, such as a charge-coupled device (CCD) or a complimentary metaloxide semiconductor (CMOS) sensor. The imaging element 14 may be relatively sensitive to heat buildup. Heat buildup can result in a loss of ability of the sensor to detect contrast, as the heat can cause a deterioration in the signal-to-noise ratio associated with the image sensor.

The image processing board 15 is configured to generate image processing board output data that relates to the video input received by the imaging element 14. Specifically, the image processing board 15 may receive raw video data directly from the imaging element 14 corresponding to the video input received by the imaging element 14. The image processing board 15 may process the raw video data to determine if there are any items of interest therein, such as, for example, oncoming vehicle headlights, objects in front of the vehicle that represent a collision risk, and vehicular lane markers. The image processing board 15 may then determine what image processing board output data to send to the vehicle interface board 16 based on the items of interest found. For example, if any oncoming vehicle headlights are identified and are determined to be sufficiently close to the vehicle in which the camera 10 is mounted, a corresponding signal may be sent to the vehicle interface board 16, for transmission to a suitable vehicle controller that can take a suitable action, such as shutting off the high beam headlights.

The image processing board 15 may comprise a digital signal processor (DSP), an application-specific integrated circuit (ASIC), a microcontroller and other elements, which can generate a relatively large amount of heat, compared to the imaging element 14 and vehicle interface board 18. Generally, heat leaving the image processing board 15 moves generally upwards, expanding laterally away from the image processing board 15 as it rises. The path of the heat leaving the image processing board 15 is referred to as the heat path and is shown at 20. The image processing board 15 may be positioned in a selected position so that the heat path 20 is spaced from the imaging element 14. For example, the image processing board 15 may be positioned generally above the imaging element 14. The heat path 20, which extends upwards from the image processing board 15 is thus spaced from the imaging element 14. To further assist in preventing heat buildup in the imaging element 14, the image processing board 15 may have an upper surface 22 that is proximate to an upper housing wall, shown at 24. As a result, at least some heat generated by the image processing board 15 passes into the upper housing wall 24 and is directed away from the interior of the camera 10. The upper surface 22 of the image processing board 15 may be in abutment with the upper housing wall 24, to further assist in removing heat from the image processing board 15. As another means of inhibiting heat buildup in the imagine element 14, the air conditioning system (not shown) of the vehicle in which the camera 10 may be mounted, may blow cool air upwards along the windshield, thus providing convective cooling for the camera 10 overall. Additionally, some cool air blown by the air conditioning system may pass into the housing 18 of the camera 10 (eg. by way of vent holes in the housing 18) and may provide at least some flow of cool air on the imaging element 14, thereby helping the imaging element 14 to dissipate heat.

It is possible in some embodiments for the image processing board 15 to be omitted. In such embodiments, the imaging element 14 may communicate directly with the vehicle interface board 16.

The vehicle interface board 16 sends signals relating to the video input received by the imaging element 14 to one or more other vehicle components, such as controllers that manage the operation of the brakes, the high-beams, and other components. For example, in embodiments wherein the image processing board 15 is provided, the vehicle interface board 16 may send signals corresponding to the image processing board output data. In embodiments wherein the image processing board 15 is omitted, the vehicle interface board 16 may send signals corresponding to the raw video data from the imaging element 14.

In the exemplary arrangement shown in FIG. 2, the image processing board 15 is positioned above the vehicle interface board 16, and as a result, the heat path 20 from the image processing board 15 is spaced from the vehicle interface board 16. One reason for this is to inhibit heating the imaging element 14 indirectly through causing a heat buildup in the vehicle interface board 16.

Data and power transfer between the imaging element 14, the image processing board 15 and the vehicle interface board 16 may be carried out by any suitable means. For example, an FFC ribbon cable (not shown) may connect the imaging element 14 to the image processing board 15. A board-to-board stacker (not shown) may connect the image processing board 15 to the vehicle interface board 16.

While the vehicle interface board 16 is shown in FIG. 2 as being separate from the image processing board 15, it is optionally possible for the vehicle interface board 16 to be joined with the image processing board 15 on a common board.

The housing 18 may extend generally upwardly at a selected angle behind the lens member 12. The selected angle may be based on the rake angle of the windshield (shown at 25 in FIG. 3a) to which the camera 10 may be mounted.

The housing 18 may be configured to assist in directing heat received from the image processing board 15 away from the interior of the camera 10. To this end, the upper housing wall 24 may be made from a thermally conductive material, such as a metal, (eg. Aluminum). Additionally, manufacturing the housing 18 from a metal such as Aluminum provides electro-magnetic compatibility (EMC) protection and electrostatic discharge (ESD) protection for the imaging element 12, the image processing board 15 and the vehicle interface board 16 contained thereon.

Figure 3A:
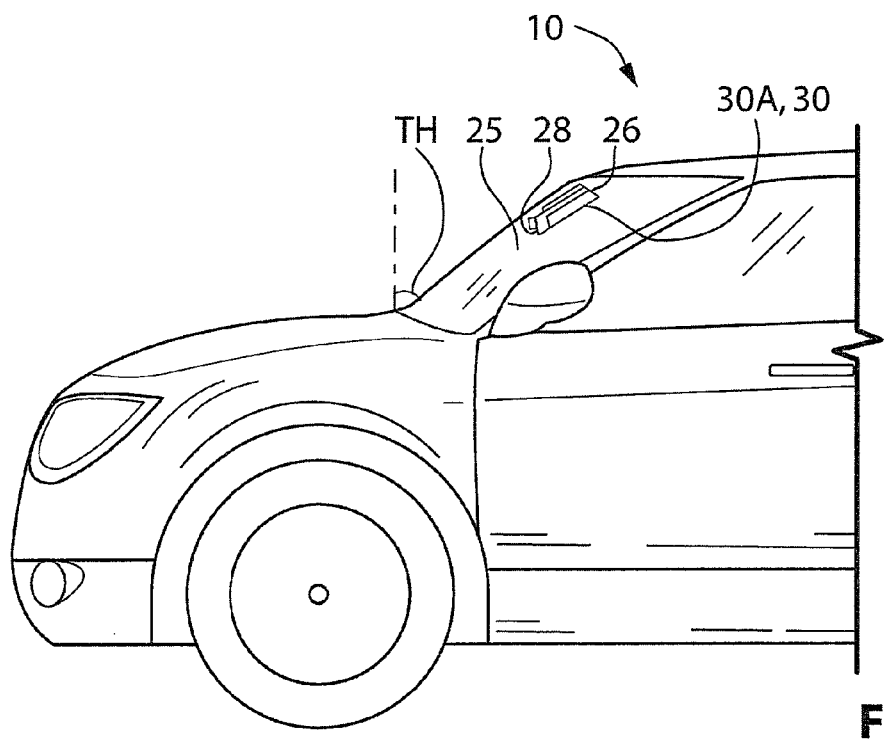
FIG. 3a is a side view of the camera shown in FIG. 1 mounted to a first vehicle windshield.
Figure 3B:
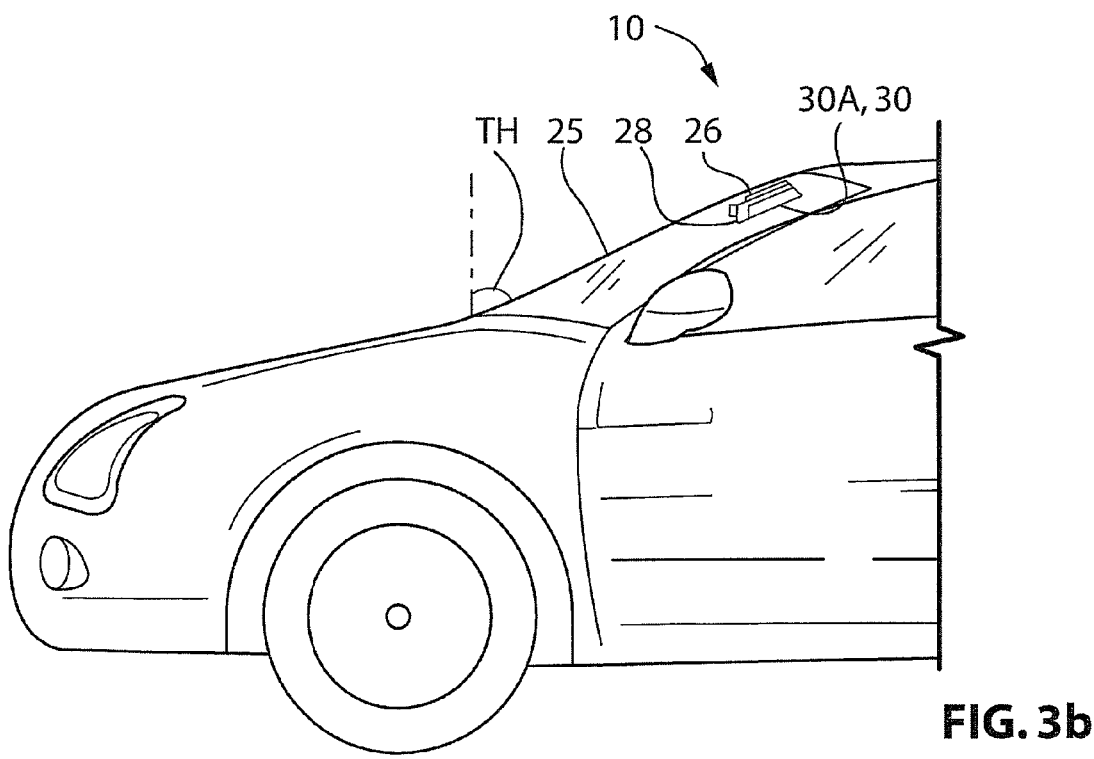
FIG. 3b is a side view of the camera shown in FIG. 1 mounted to a second vehicle windshield.

The housing 18 may include an upper housing member 26, a front housing member 28, and a lower housing member 30. The upper housing member 26 may be configured for mounting to a vehicular component, such as the windshield 25. As shown in FIGS. 3a and 3b, the windshield rake angle, shown at TH, which is the windshield angle relative to the vertical, may vary from vehicle model to vehicle model. The lens member 12, however, may have a relatively consistent orientation (approximately horizontal) regardless of the vehicle in which it is mounted. As a result, the orientation of the front housing member 28, which holds the lens member 12, relative to the upper housing member 26 varies from vehicle model to vehicle model. To accommodate this variation, the front housing member 28 may be hingedly connected to the upper housing member 26. As a result, a common upper housing member 26 and front housing member 28 may be used in the assembly of the camera 10 for several different vehicle models. The upper housing member 26 substantially completely defines the top of the housing 18, shown at 32, and the rear of the housing 18, shown at 34. The front housing member 28 substantially completely defines the front of the housing 18, shown at 36.

The lower housing member 30 may be configured to define the bottom of the housing 18, shown at 38, and both sides of the housing 18, one of which is shown at 40 in FIG. 1.

Referring to FIGS. 3a and 3b, the lower housing member 30 may be configured for each vehicle model to which the camera 10 is mounted. Thus, a manufacturer may keep an inventory of first lower housing members 30a for vehicles with the windshield 25 shown in FIG. 3a, and an inventory of second lower housing members 30b for vehicles with the windshield 25 shown in FIG. 3b. By keeping different lower housing members 30 for different vehicle models, and common upper housing members 26 and front housing members 28, a manufacturer can provide a camera 10 that appears tailored to each vehicle model while having at least some commonality of parts to reduce inventory and manufacturing cost.

The camera 10 may be mounted at any suitable position on the windshield 25. Preferably, the camera 10 is mounted at or near the longitudinal centerline of the windshield 25, and in the wipe zone of the windshield 25 (ie. the zone of the windshield 25 that is clearable by the windshield wiper system). For certain types of windshield wiper system, such as 'butterfly' wiper systems (ie. wherein the windshield wipers counter-rotate), the wipe zone at the longitudinal centerline of the windshield 25 is relatively low. By providing the camera 10 with three separate boards (eg. the imaging element 14, the image processing board 15 and the vehicle interface board 16), and by configuring the camera 10 so that the imaging element 14 extends generally vertically and so that the image processing board 15 and the vehicle interface board 16 are stacked and extend generally parallel to the upper housing member 26 behind the imaging element 14, the camera 10 is configured to remain relatively close to the windshield 25 and has a relatively thin profile so as not to unduly obstruct the view of the driver out through the windshield 25.

It will be understood that when the camera 10 is described as being mounted to the vehicle windshield 25, it need not be directly mounted to the windshield 25 itself. It may be indirectly mounted to the windshield 25 through one or more intermediate members, such as mounting brackets and the like.

In alternative embodiments, the circuit board arrangement in the camera 10 may be similar to that shown in U.S. Pat. Nos. 6,824,481, 6,975,215, 7,188,963, 7,460,007, 7,480,149, 6,326,613, 6,593,565, 6,774,356, 7,041,965, 7,262,406, 7,265,342, 7,420,159, 7,538,316 all of which are hereby incorporated by reference.

In alternative embodiments, the housing construction of the camera 10 may be similar to that shown in U.S. Pat. Nos. 6,824,481, 6,975,215, 7,188,963, 7,460,007, 7,480,149, 6,326,613, 6,593,565, 6,774,356, 7,041,965, 7,262,406, 7,265,342, 7,420,159, 7,538,316 all of which are hereby incorporated by reference.

While the above description constitutes a plurality of embodiments of the present invention, it will be appreciated that the present invention is susceptible to further modification and change without departing from the fair meaning of the accompanying claims.

The invention claimed is:

1. A camera for mounting at a windshield of a vehicle, the camera comprising:
    a housing, wherein the housing is formed of a thermally conductive metallic material that provides electro-magnetic compatibility protection and electrostatic discharge protection;
    a lens member;
    an imaging element disposed in the housing and positioned to receive video input from the lens member;
    wherein, when the camera is mounted at the windshield of the vehicle, the imaging element is generally vertically oriented;
    an image processor disposed on an image processing board disposed in the housing, wherein said image processor is operable to generate image output data that relates to the video input received by the imaging element;
    circuitry operable to communicate signals relating to the image output data to a vehicle component;
    wherein, when the camera is mounted at the windshield of the vehicle, the image processing board is generally non-vertically oriented; and
    wherein the image processing board is positioned in a selected position to release heat along a heat path that is spaced from the imaging element.

2. A camera as claimed in claim 1, wherein, when the camera is mounted at the windshield of the vehicle, the image processing board is positioned generally above the imaging element.

3. A camera as claimed in claim 2, wherein the housing includes an upper housing wall, and wherein the image processing board is positioned substantially in abutment with the upper housing wall.

4. A camera as claimed in claim 3, wherein the upper housing wall comprises aluminum.

5. A camera as claimed in claim 2, wherein the circuitry is disposed at a vehicle interface board and wherein the image processing board is positioned above the vehicle interface board.

6. A camera as claimed in claim 1, wherein the circuitry is disposed on the image processing board.

7. A camera as claimed in claim 1, wherein, when the camera is mounted at the windshield of the vehicle, (i) the housing extends generally from the lens member upwardly at a selected angle, (ii) the imaging element is oriented generally vertically behind the lens member, and (iii) the housing includes an upper housing wall and the image processing board is positioned in abutment with the upper housing wall.

8. A camera for mounting on a vehicle windshield, comprising:
    a housing with an upper housing wall, wherein the housing is mountable to the vehicle windshield such that the upper housing wall is generally parallel to the vehicle windshield;
    wherein the housing is formed of a thermally conductive metallic material that provides electro-magnetic compatibily protection and electrostatic discharge protection;
    a lens member;
    an imaging element disposed in the housing and positioned to receive video input from the lens member;
    wherein, when the camera is mounted at the windshield of the vehicle, the imaging element is generally vertically oriented;
    an image processor disposed on an image processing board disposed in the housing wherein the image processor is operable to generate image output data that relates to the video input received by the imaging element; and
    circuitry operable to communicate signals relating to the image output data to a vehicle component;
    wherein when the camera is mounted at the windshield of the vehicle, the image processing board is generally non-vertically oriented; and
    wherein the housing is configured to be at a selected angle relative to the lens member, wherein the image processing board is positioned behind the imaging element and is generally parallel to the housing.

9. A camera as claimed in claim 8, wherein the selected angle permits the lens member to extend generally horizontally when the housing is mounted to the vehicle windshield.

* * * * *

UNITED STATES PATENT AND TRADEMARK OFFICE
CERTIFICATE OF CORRECTION

| | |
|---|---|
| PATENT NO. | : 8,570,374 B2 |
| APPLICATION NO. | : 12/618153 |
| DATED | : October 29, 2013 |
| INVENTOR(S) | : Laura Betham et al. |

It is certified that error appears in the above-identified patent and that said Letters Patent is hereby corrected as shown below:

In the Claims

Column 6
Line 41-42, Claim 8, "compatibily" should be --compatibility--

Signed and Sealed this
Seventh Day of April, 2015

Michelle K. Lee
*Director of the United States Patent and Trademark Office*